United States Patent [19]
Li et al.

[11] Patent Number: 5,704,004
[45] Date of Patent: Dec. 30, 1997

[54] APPARATUS AND METHOD FOR NORMALIZING AND CATEGORIZING LINEAR PREDICTION CODE VECTORS USING BAYESIAN CATEGORIZATION TECHNIQUE

[75] Inventors: Tze Fen Li, Kaohsiung; Chung-Mou Pengwu; Cheng-Der Chen, both of Taipei; Chung-Yu Sun, Hsinchu, all of Taiwan

[73] Assignee: Industrial Technology Research Institute, Taipei, Taiwan

[21] Appl. No.: 786,551

[22] Filed: Jan. 21, 1997

Related U.S. Application Data

[63] Continuation of Ser. No. 160,580, Dec. 1, 1993, abandoned.
[51] Int. Cl.$^6$ ............................................. G10L 3/00
[52] U.S. Cl. ................... 395/2.52; 395/2.28; 395/2.43; 395/2.45
[58] Field of Search ........................... 395/2.52, 2.28, 395/2.43, 2.45

[56] References Cited

U.S. PATENT DOCUMENTS

| | | | |
|---|---|---|---|
| 3,969,700 | 7/1976 | Bollinger et al. | 340/146.3 |
| 4,803,729 | 2/1989 | Baker | 381/43 |
| 4,837,831 | 6/1989 | Gillick et al. | 381/43 |
| 4,852,180 | 7/1989 | Levinson | 381/43 |
| 4,894,275 | 1/1990 | Watanabe et al. | 381/43 |
| 4,991,218 | 2/1991 | Fujii et al. | 381/41 |
| 5,062,137 | 10/1991 | Watanabe et al. | 381/46 |
| 5,075,895 | 12/1991 | Wilcox et al. | 381/41 |
| 5,131,043 | 7/1992 | Fujii et al. | 381/41 |
| 5,345,536 | 9/1994 | Hoshimi et al. | 395/2.52 |

OTHER PUBLICATIONS

Makhoul, John, "Linear Prediction: A Tutorial Review" Proceedings of the IEEE, vol. 63, No. 4, Apr., 1975.

*Primary Examiner*—Allen R. MacDonald
*Assistant Examiner*—Vijay Chawan
*Attorney, Agent, or Firm*—Finnegan, Henderson, Farabow, Garrett & Dunner, L.L.P.

[57] ABSTRACT

The present invention discloses a pattern matching system applicable for syllable recognition which includes a dictionary means for storing a plurality of standard patterns each representing a standard syllable by at least a syllable feature. The pattern matching system further includes a converting means for converting an input pattern representing an unknown syllable into a categorizing pattern for representing the unknown syllable in the syllable features used for representing the standard syllables. The pattern matching system further includes a Bayesian categorizing means for matching the standard pattern representing the standard syllable and the categorizing pattern representing the unknown syllable for computing a Bayesian miscategorization risk for each of the standard syllables, the Bayesian categorization means further including a comparing and identification means for selecting a standard syllable which has the least mis-categorization risk as an identified syllable for the input unknown syllable.

14 Claims, 4 Drawing Sheets

APPARATUS AND METHOD FOR NORMALIZING AND CATEGORIZING LINEAR PREDICTION CODE VECTORS USING BAYESIAN CATEGORIZATION TECHNIQUE

This is a continuation of application Ser. No. 08/160,580, filed Dec. 1, 1993 now abandoned.

BACKGROUND OF THE INVENTION

1. Field of the Invention

This invention relates generally to an apparatus and method for speech recognition. More particularly, this invention relates to the apparatus and method for syllable waveform compression and accurate recognition by the use of simplified Bayesian techniques whereby the processing time for syllable recognition is shortened.

2. Description of the Prior Art

The non-linear dynamic characteristics of expansion and contraction and the sequential time-varying features of the syllable pronunciations greatly complicate the tasks of automatic speech recognition. In order to accurately recognize the uttered speech, a computerized speech recognition system must first extract the linguistic information from the acoustic signal by first determining and discarding the extra-linguistic data. The extra-linguistic data contained in the acoustic signals may include characteristic features of the speaker's identity, speaker's physiological and psychological states, and the acoustic environment such as the surrounding noises. The speech recognition system must then normalize a sequence of feature vectors which is used to characterize the utterance now represented by the linguistic portion of the acoustic signals. These tasks are quite complex and would generally take considerable amount of computer time to accomplish. Since for an automatic speech recognition system to be practically useful these tasks must be performed in a real time basis, the requirement of extra computer processing time may often limit the development of a real-time computerized speech recognition system.

There are on-going efforts to improve the capability of syllable recognition. Several techniques have been developed to perform two major tasks of syllable recognition, namely the tasks of features extraction and utterance classification. Before the task of feature extraction is performed, the physical utterance in the form of speech waveforms are first measured including the measurements of energy, zero crossings, extrema count, formants and LPC coefficients. Using the LPC coefficients for representation of the speech utterances provides a robust, reliable and accurate method for estimating the parameters that characterize the linear, time-varying system which is used to approximate the nonlinear, time-varying characteristics of the speech waveforms. There are several methods used to perform the task of utterance classification. Few of these methods which have been practically used in automatic speech recognition systems are dynamic time wrapping (DTW) pattern-matching, vector quantization (VQ), and hidden Markov model (HMM). The DTW methodology which provides nonlinear time-axis expansions or contractions of an input phoneme which is then matched with the phoneme or landmark positions of the template phonemes. Dynamic programming techniques are used for pattern matching in DTW which has shown some successful results. However, since the dynamic programming techniques are very computational intensive and requires extraordinary computer processing time, this method is not practically useful for real-time application.

Therefore, there is still a need in the art of manufacturing the fiber optic device to provide an apparatus and method such that the manufacturing steps of fusing and stretching can be precisely measured and controlled to assure high quality of optical devices are consistently produced. For the purpose of enabling the mass production of these high quality optical devices, the apparatus and method must be reliable and simple to use such that the processing steps would not become too complicate and that the manufacturing cost can be maintained at a reasonable level.

SUMMARY OF THE PRESENT INVENTION

It is therefore an object of the present invention to provide an apparatus and method to overcome the aforementioned difficulties encountered in the prior art.

Specifically, it is an object of the present invention to provide an apparatus and method to improve the speed of syllable recognition by the use of more effective waveform compression and classification methodologies whereby real time syllable recognition becomes more achievable.

Another object of the present invention is to provide a syllable recognition system and method wherein the syllable utterance waveforms are compressed into feature vectors by employing techniques which is simple to save computation resources yet capable of generating feature vectors which characterize all major dynamic features of the syllable.

Another object of the present invention is to provide a syllable recognition system and method wherein the classification of the compressed feature vectors for syllable recognition are accomplished by the use of Bayesian techniques which is systematic and can be conveniently automated and optimized such that modem processing power can be easily applied for syllable recognition.

Briefly, in a preferred embodiment, the present invention discloses a pattern matching system applicable for syllable recognition which includes a dictionary means for storing a plurality of standard patterns each representing a standard syllable by at least a syllable feature. The pattern matching system further includes a converting means for converting an input pattern representing an unknown syllable into a categorizing pattern for representing the unknown syllable in the syllable features used for representing the standard syllables. The pattern matching system further includes a Bayesian categorizing means for matching the standard pattern representing the standard syllable and the categorizing pattern representing the unknown syllable for computing a Bayesian mis-categorization risk for each of the standard syllables, the Bayesian categorization means further including a comparing and identification means for selecting a standard syllable which has the least mis-categorization risk as an identified syllable for the input unknown syllable.

It is an advantage of the present invention that it provides an apparatus and method to improve the speed of syllable recognition by the use of more effective waveform compression and classification methodologies whereby real time syllable recognition becomes more achievable.

Another advantage of the present invention is that it provides a syllable recognition system and method wherein the syllable utterance waveforms are compressed into feature vectors by employing techniques which is simple to save computation resources yet capable of generating feature vectors which characterize all major dynamic features of the syllable.

Another advantage of the present invention is that it provides a syllable recognition system and method wherein the classification of the compressed feature vectors for syllable recognition are accomplished by the use of Bayesian techniques which is systematic and can be conveniently automated and optimized such that modern processing power can be easily applied for syllable recognition.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
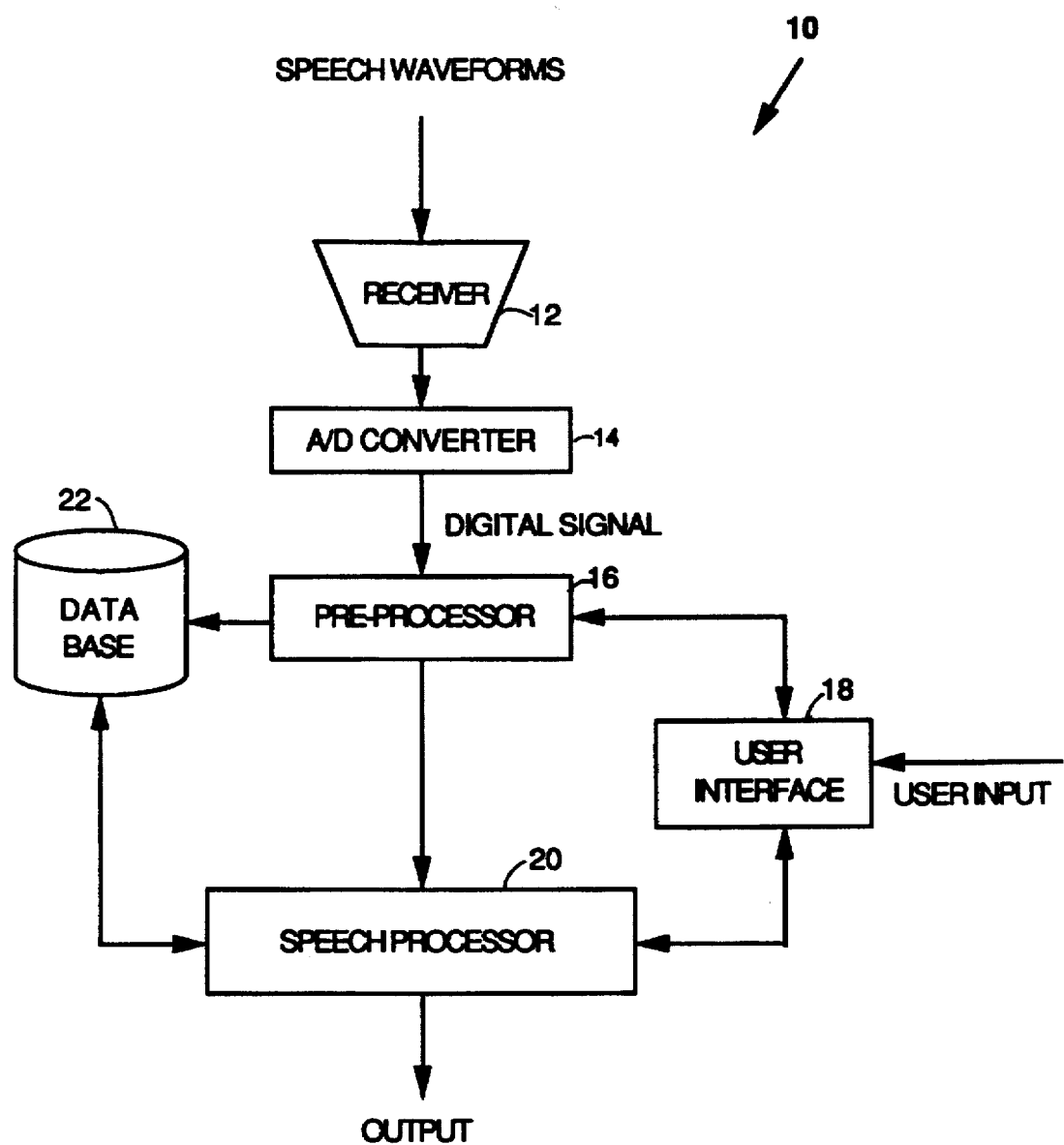
FIG. 1 is a schematic diagram illustrating the system configuration of a speech recognition system according to the present invention.
Figure 2:
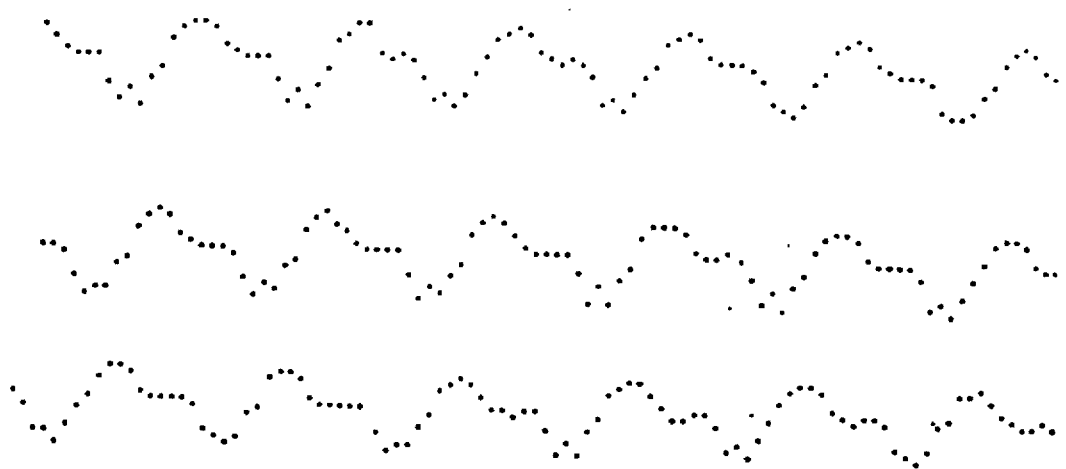
FIG. 2 shows a plurality of waveforms representing the syllable utterance in analog forms.

FIG. 1 shows a speech recognition system 10 which includes an audio receiver 12 for receiving a series of speech waveforms representing a syllable utterance. FIG. 2 shows a plurality of these wave forms and the waveforms received by the audio receiver 12 are in continuous analogy form. A digital converter 14 then converts these waveforms into a series of digital signals. A preprocessor 16 receives these digital signals from the digital converter 14 to compute a set of linear predictive coding (LPC) coefficients and then transform these coefficients into a corresponding set of LPC cepstra. (The details of these computations will be described below) This set of LPC cepstra are inputted to a speech processor 20 and/or a database 22. The tasks performed by the speech processor 20, which will be described below, including the compression of the cepstra to extract dynamic features of the syllable utterance according to the compression methodologies of the present invention to be described below and then using these compressed cepstra to identify the syllable by classification. The speech recognition system 10 further includes an user interface means 18 to allow an user of the system 10 to control the system operation and to provide user input as data or commands to the speech recognition system 10.

A pattern matching system applicable for syllable recognition 10 is disclosed in this invention which comprises a dictionary means included in the database 22 for storing a plurality of standard patterns each representing a standard syllable by at least a syllable feature. The pattern matching system also includes a converting means included in the preprocessor 16 for converting an input pattern representing an unknown syllable (one example is shown in FIG. 2) into a categorizing pattern for representing the unknown syllable in the syllable features used for representing the standard syllables. The pattern matching system 10 further includes a Bayesian categorizing means included in the speech processor 20 for matching the standard pattern representing the standard syllable and the categorizing pattern representing the unknown syllable for computing a Bayesian mis-categorization risk for each of the standard syllables. The method of the computation will be discussed below. The Bayesian categorization means included in the speech processor further includes a comparing and identification means for selecting a standard syllable which has the least mis-categorization risk as an identified syllable for the input unknown syllable.

A method for matching and categorizing an input pattern of waveform applicable for syllable recognition is also disclosed in the present invention. The method comprises the steps of: (a) storing in a dictionary means, included in the database 22, a plurality of standard patterns each representing, by at least a standard syllable feature, a standard syllable; (b) converting the input pattern of waveform representing an unknown syllable into a categorizing pattern for representing the unknown syllable by the syllable features used for representing the standard syllables; (c) matching the standard pattern representing the standard syllable and the categorizing pattern representing the unknown syllable by utilizing a Bayesian categorizing means, included in the speech processor 20, for computing a Bayesian mis-categorization risk for each of the standard syllables; and (d) comparing and selecting a standard syllable which has the least mis-categorization risk as an identified syllable for the input unknown syllable.

In receiving the digitized waveform data, the preprocessor 16 first assumes that this series of sampled speech utterance in digital form as measured can be represented as s(n), and that each sampled waveform s(n) can be linearly predicted from the past p samples of s(n). Then, a linear approximation of s(n), i.e., s'(n) can be formulated as:

$$S'(n) = \sum_{k=1}^{p} a(k)s(n-k) \quad (1)$$

where the coefficients a(k), k=1,2,3, . . . p are generally referred to as the linear predict coding (LPC) coefficients and can be solved by the least square method. Let E be the squared difference between s(n) and s'(n) over N samples of s(n), then E may be represented as:

$$E = \sum_{k=0}^{N-1} [s(n) - s'(n)]^2 \quad (2)$$

The least square method can be used to obtain the values of the LPC coefficients, i.e., a(k), by minimizing the value of E. Various techniques are developed, among them Durban's recursive procedure (see J. Makhoul 'Linear Prediction: A tutorial Review', Proc. IEEE, vol.63, no.4, pp 561–580, April 1975) is an efficient method for computing the LPC coefficients. The least square method is well known in the art and commercial software programs are readily available for the purpose of computing the LPC coefficients according to Equation (2). The details of the least square computations will therefore not be repeated here in this Patent Application.

In order to apply the Bayesian techniques for waveform classification for syllable recognition, the LPC coefficients are first transformed into LPC cepstra. The following recursive equations are used to transform the LPC coefficients a(k) to the LPC cepstrum a'(k):

$$a'(1) = -a(1) \quad (3)$$

$$a'(i) = -a(i) - \sum_{j=1}^{i-1} (1 - j/i)a(j)a'(i-j) \quad 1 < i \leq P \quad (4)$$

$$a'(i) = -\sum_{j=1}^{p} (1 - j/i)a(j)a'(i-j) \quad P < i \quad (5)$$

For more details concerning the detailed mathematical formulations and the advantages of using the LPC cepstrum please refer to 'Digital Speech Processing, Synthesis, and Recognition' by Sadaoki Furui, Published by Marcel Dekker, Inc. (New York and Basel, 1989, P67.)

The waveform of each syllable is now represented by a plurality of vectors wherein each vector comprises a plurality of cepstra. For example, each of the vectors for representing a mandarin syllable typically includes 16 LPC cepstra. Since the waveforms representing the utterance of a syllable by a speaker may vary from time to time, even for a single syllable by the same speaker, depending on the duration of the utterance and various other factors of measurement for each specific utterance. Consequently, the LPC cepstrum vectors used for representing a syllable waveform are often varying over time in a dynamically non-linear manner. For the purpose of syllable recognition, the cepstrum vectors used for representing each single syllable must be normalized and 'standardized' by a single set of vectors each of which includes a single set of cepstra representing the unique features of the syllable. And then, when a syllable is uttered by a speaker, the waveform for that specific syllable must be rapidly collected and converted to LPC cepstrum vectors. These cepstrum vectors must then be normalized and compared with this set of 'standardized' cepstrum vectors to determine a best category for this uttered syllable in order to perform the task of speech recognition.

Because of the nonlinear time-varying characteristics of the syllable waveforms and the associated cepstrum vectors, special techniques are used in this invention to perform the normalization. In order or to distinguish and then identify each syllable, it should be noted an utterance of a syllable may be divided into two basic parts; i.e., a stable part and a feature part. The feature part comprises wave patterns of peaks and valleys representing the unique characteristics of the syllable utterance and the stable parts representing the flat waveform portions between two wave patterns of the feature part. In addition to the shape of the waveform for a syllable, the duration of utterance may have nonlinear expansion or contraction wherein the stable part may have different lengths between two wave patterns. In order to accurately identify the syllable utterance, a compression process must first be performed to remove the stable flat portions of a syllable waveform in order to extract only the feature part for syllable identification. Therefore, the normalization process must also comprise a compression step before the task of feature extraction can be carried out.

In order to resolve the limitations experienced by the prior art, this invention utilizes three processing techniques to expedite the compression operation such that speech recognition can be practically performed in a real time basis These three processing techniques are described below.

The first processing technique is to perform a waveform LPC cepstra compression on the basis of the absolute value of the LPC vectors. The k-th frame of a speech waveform is represented by a LPC vector, i.e., y(k) where k=1,2,3, ... ,n, and each of these vectors has p-components, i.e., (y(k)1, y(k)2, ... y(k)p). The number of flames, i.e., n, depends on the length of the speech waveform. Let $$S = \sum_{k=1}^{n} \sum_{i=1}^{p} |y(k)i| \qquad (6)$$

be the total sum of the absolute values of the elements of a LPC vector. The total length of the speech waveform is then segmented into ten sections such that each section has the absolute value of S/10 whereby the part of the speech waveform with large absolute value of the LPC elements are divided into more segments. The average value of the LPC cepstra is then calculated for each segment as a segment-average which is used as a first feature characteristics for compression.

The second method of compression is by deleting the stable portion of the LPC vectors. Let the difference of two consecutive LPC vectors be denoted as:

$$D(k) = \sum_{i=1}^{p} |y(k)i - y(k-1)i|, \qquad (7)$$

for k=2,3,4, ... ,n, and the LPC vector y(k) is deleted if its difference D(k) from the previous vector y(k-1) is below a threshold value. Let y'(k) where k=1,2,3, ... , m and m≦n be the new sequence of the LPC vectors after the above deletion operation. The new sequence of the LPC vectors are then divided into ten equal sections and each section has m/10 vectors. The average value of the LPC cepstra in each of these ten equal sections is used as a difference-feature for that section.

A third method of compression is by first deleting the stable parts of the LPC vectors as the second method by performing a computation on the LPC vectors according to Equation (7) to obtain a new series of LPC vectors, y1(k), k=1,2,3, ... , m, and then a compression according to the sum, i.e., S1, of the absolute differences of two consecutive LPC vectors, i.e., |y(k)i−y(k−1)i|, is performed based on the following computation:

$$S1 = \sum_{k=2}^{m} \sum_{i=1}^{p} |y(k)i - y(k-1)i|, \qquad (8)$$

The LPC vectors y1(k), k=1,2,3, ... m, are divided into ten sections such that the sum of the differences of two consecutive LPC vectors in each section is equal to S1/10. The average value of the LPC cepstra in each section is a sum-difference-feature of that section.

With the feature vectors for characterizing the waveforms of the syllables, a simplified Bayesian decision rule is utilized to distinguish and identify the syllables according to the categorizations obtained by the computations applying these decision rules.

The speech processor 20 now receives the compressed LPC cepstra represented by a vector X=(x(1), x(2), ... ,x(k)) which is the input feature vector of a speech from the preprocessor 16. It is the task for the speech processor 20 to determine whether the input feature vector belongs to category C(i) wherein C(i) is one of the M categories, i.e., categories C(1), C(2), ... C(M), and the data are stored in the database 22. In order to determine whether the input feature vector X belongs to a category C(i), the speech processor 20 employs a simplified Bayes derision rule. Explanation of the mathematical formulation is provided below.

Let $f(X|C(i))$ be the conditional normal density function of X given category C(i) and the prior probability t be constant, i.e., each category has equal probability to occur. A simple loss function for a decision rule d is used wherein the loss function is one when a miscalculation is made and one when the derision rule d is correct. Let R(t,d) denotes a risk function, i.e., the probability of miscalculation of d, and G(i) where i=1,2,3, ... ,M be m regions separated by the derision rule d in a k-dimensional domain of X, i.e., d decides C(i) when X is contained in G(i). The risk function R(t,d) can be expressed as:

$$R(t,d) = \sum_{i=1}^{m} \int_{G(i)^c} f(x|Ci)dx \qquad (9)$$

Where $G(i)^c$ is the complement of G(i). Let D be the family of all decision rules that separate M categories. Let the minimum probability of misclassification be denoted by R(t):

$$R(t) = \inf_{d \in D} R(t,d) \qquad (10)$$

A decision rule that satisfies (10) is called the Bayes decision rule with respect to the prior derision t which can be represented as:

$$d_t(x) = Ci \text{ if } f(x|Ci) > f(x|C_j) \qquad (11)$$

for all $j \neq i$.

In order to achieve higher speed computation, the density function $f(x|Ci)$ is assumed to be normal and the feature vectors are assumed to be stochastically independent. The conditional density function is then approximately represented by a function as:

$$f(x1, \ldots, xk|Ci) = \left[ \prod_{l=1}^{K} 1/(\sqrt{2\pi} \ \sigma_{il}) \right] e^{-(\frac{1}{2}) \sum_{l=1}^{k} (x - \mu_{il}/\sigma_{il})^2} \qquad (12)$$

where $i=1,2,3 \ldots, M$ and M is the number of syllables to be recognized. For the purpose of classification, the logarithmic values of $f(x1, \ldots, xk| Ci)$ are compared:

$$L(Ci) = \sum_{l=1}^{K} \log \sigma_{il} + (1/2) \sum_{l=1}^{k} (x - \mu_{il}/\sigma_{il})^2 \qquad (13)$$

The category Ci which has the least L(Ci) is identified as the syllable which the input feature vector $X = (X_1, X_2, \ldots, X_k)$ belongs.

Figure 3:
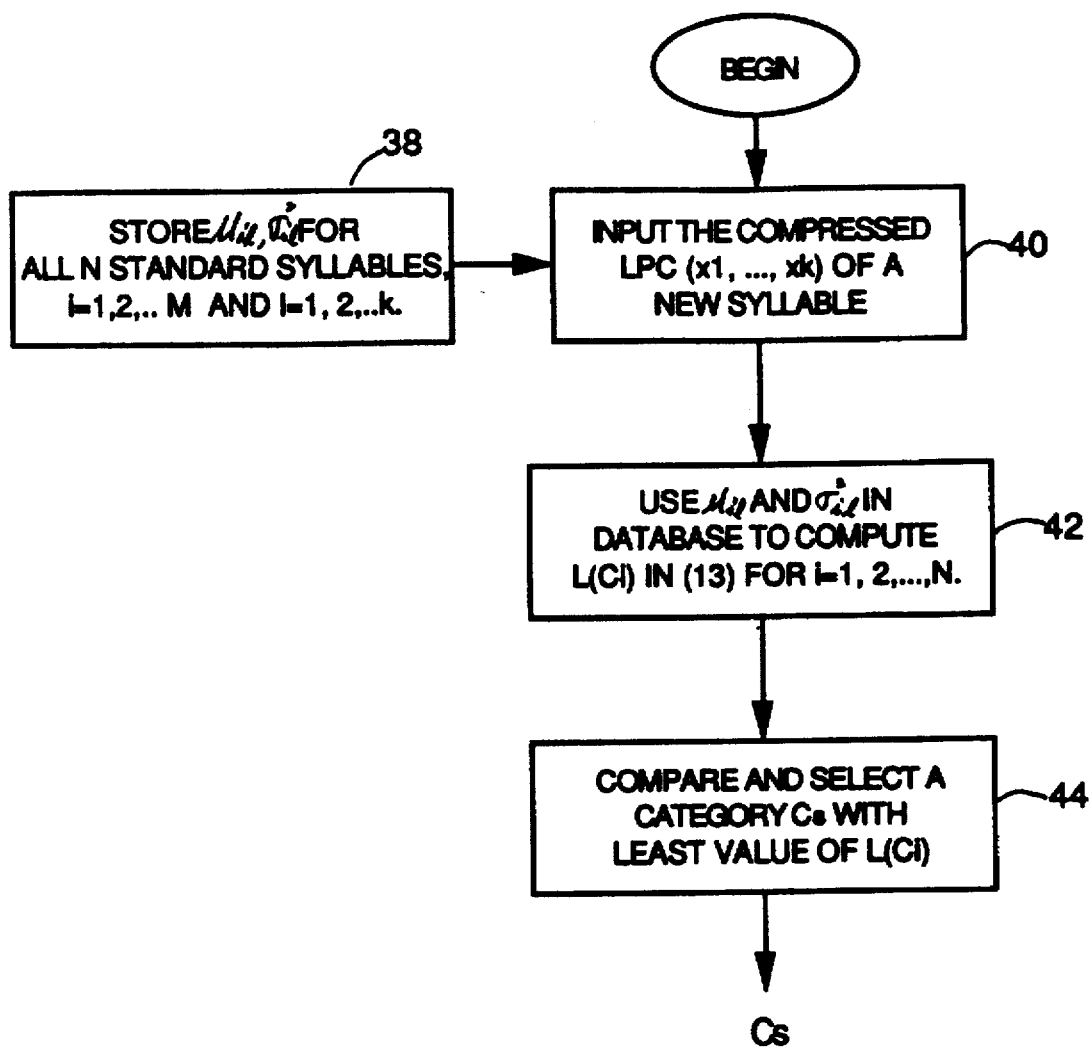
FIG. 3 is a flow-chart diagram showing the processing steps of a Bayesian classification and identification means for classifying and identifying an input syllable.

FIG. 3 is a flow chart diagram showing the processing steps performed by a Bayesian classification means included in the speech processor 20 to classify the compressed LPC cepstra to identify the input utterance waveforms as one of the syllables. By assuming that the compressed LPC cepstra (x1, . . . ,xk) have a normal distribution, the Bayesian classification means 16-2 first computes the mean $\mu_{il}$ and variance $\sigma^2_{il}$ where l=1,2,3, . . . ,K (step 40) for each category i representing a standard syllable utterance and store them in the database 22. Let (x1, . . . ,xk) be the compressed LPC for a new syllable utterance. The Bayesian classification means 16-2 then computes the logarithmic value L(Ci) by the use of Equation (13) (step 42) for each category Ci, where i=1,2,3, . . . M. The Bayesian dassification means then compares the value of L(Ci) to determine a category Cs which has the least value (step 44), i.e., Ls(Ci). The syllable represented by the category Cs is identified as the syllable of the input utterance. It should be noted that the data for each category representing a standard syllable utterance which are used in the above computations are stored in the database 22 (see FIG. 1).

Figure 4:
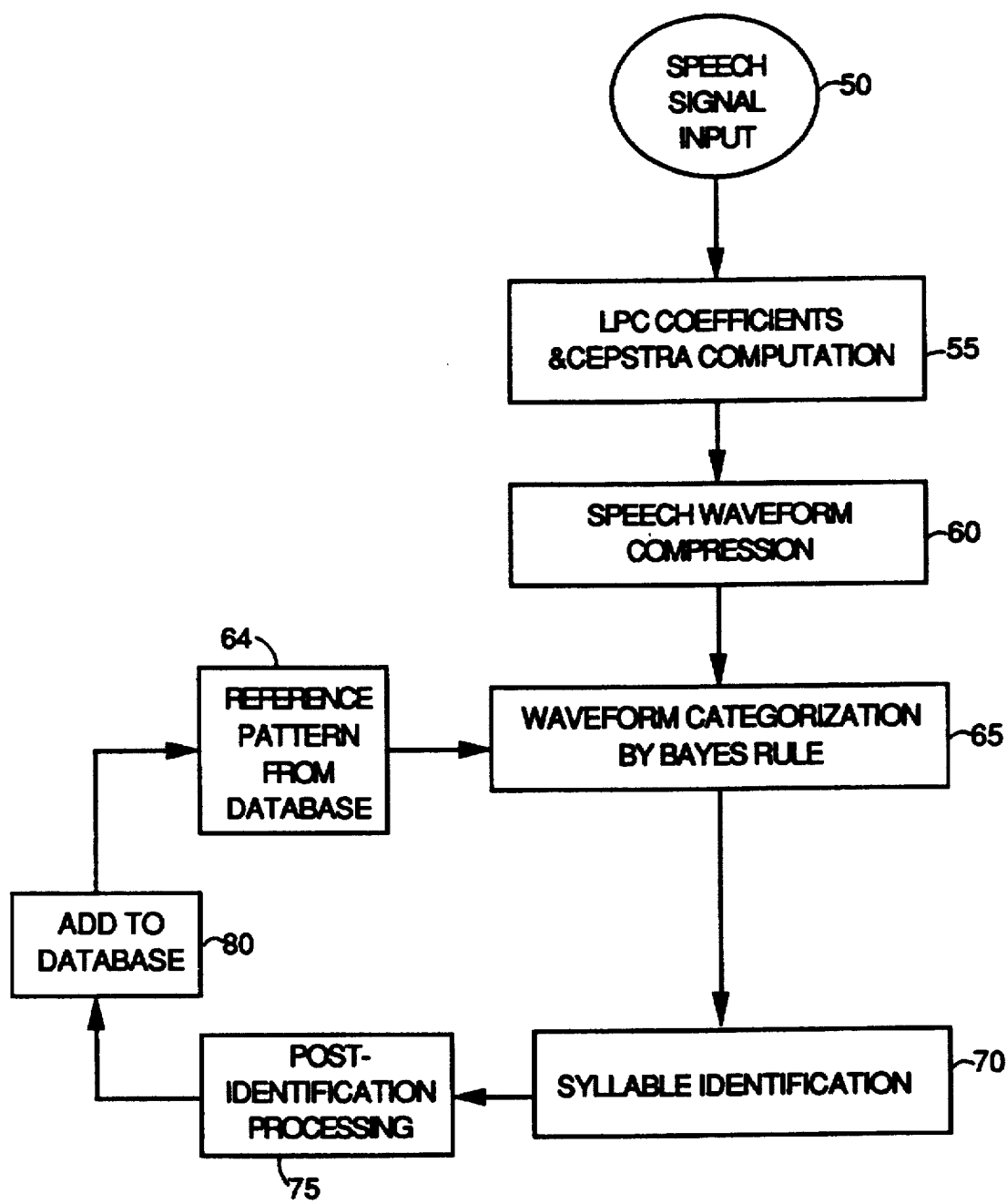
FIG. 4 is a flow-chart diagram showing the processing steps performed by the speech recognition of FIG. 1 for identifying an input syllable utterance.

FIG. 4 is a flow-chart diagram showing the processing steps performed by the speech recognition system 10 to accomplish the classification and identification of a syllable. The speech signal is inputted and received (step 50) as digitized speech signals after being digitized by the A/D converter. A LPC coefficients and cepstra computation is then performed (step 55) according to Equations (1) to (5). The LPC cepsta vectors are then compressed by a compression means 16-1 of the speech processor 16 by the use of Equations (6) to (8). The compressed LPC cepstra vectors are then categorized (step 65) by the Bayesian classification means 16-2 by the use of Equation (13). A syllable is identified (step 70) which is the category identified by the Bayesian classification means 16-2 that has the least L(Ci) value. A variety of post identification processes may be performed (step 75) before the data is added to the data base (step 80) which may be used as part of the reference pattern for the data base (step 64) for future identification of new syllable input.

A pattern matching system 10 applicable for syllable recognition is thus disclosed in the present invention. The pattern matching system 10 comprises a receiver 12 for receiving an incoming syllable utterance of either a standard syllable or an unknown syllable in the form of wavefunctions. The pattern matching system 10 further includes an analog to digital conversion means 14 for converting the wavefunctions to a plurality of digital data representing the wavefunctions. The pattern matching system further includes a linear predictive coding (LPC) means included in the preprocessor 16 for converting the digital data representing the input wavefunction into a LPC cepstra vector. The pattern matching system further includes a speech processor 20 which includes a compression means for compressing the each LPC cepstra vector into a compressed cepstra vector. The pattern matching system further has a database 22 which includes a dictionary means for storing a plurality of standard compressed cepstra vectors each representing a standard syllable. The speech processor 20 further includes a Bayesian categorizing means for matching each of the standard compressed cepstra vectors with the compressed cepstra vector of the unknown syllable for computing a Bayesian mis-categorization risk for each of the standard syllables. The Bayesian categorization means further includes a comparing and identification means for selecting a standard syllable which has the least mis-categorization risk as an identified syllable for the input unknown syllable. The pattern matching system 10 further includes an user interface means 18 to allow an user of the pattern matching system 10 to input data and commands for controlling the operation of the matching system. In a preferred embodiment, the linear predictive coding (LPC) means included in the pre-processor 16 employs Equations (1) to (5) for converting the digital data representing the input wavefunction into a LPC cepstra vector. The compression means, included in the speech processor 20 employs one of the methods as described in Equations (6) to (8) for compressing the LPC cepstra vector into a compressed cepstra vector. And, the Bayesian categorizing means included in the speech processor 20 employs Equations (13) for computing a Bayesian mis-categorization risk for each of the standard syllables and for selecting a standard syllable which has the least mis-categorization risk as an identified syllable for the input unknown syllable.

The Speech recognition system 10 as disclosed in this invention thus resolve the major difficulties of the prior art by first utilizing an effective compression method to extract the essential dynamic features of the waveforms representing the syllable utterance. The speech recognition system 10 then employs the Bayesian method which can be conveniently programmed or implemented in hardware design to perform the categorization and identification process in a high speed automated manner. The speed for speech recognition is therefore substantially improved to allow real time speech recognition operation. The accuracy of speech is also improved because the compression method capture all the major dynamic features of the waveforms representing the syllables while the Bayesian categorization method provides a systematic methodology to quantify the results of comparisons between different categories. By the use of the speech recognition system and method as disclosed in the present invention, the task of computerized speech recognition thus becomes more likely to be practically carried out in a real time fashion.

Also disclosed in the present invention is a method for matching and categorizing an input pattern of waveform applicable for syllable recognition. The method comprises the steps of: (a) storing in a dictionary means a plurality of standard patterns each representing, by at least a standard syllable feature, a standard syllable (step 38 in FIG. 3); (b) converting the input pattern of waveform representing an unknown syllable into a categorizing pattern for representing the unknown syllable by the syllable features used for representing the standard syllables (step 40); (c) matching the standard pattern representing the standard syllable and the categorizing pattern representing the unknown syllable by utilizing a Bayesian categorizing means for computing a Bayesian mis-categorization risk for each of the standard syllables (step 42); and (d) comparing and selecting a standard syllable which has the least mis-categorization risk as an identified syllable for the input unknown syllable (step 44).

In another preferred embodiment, the method for matching and categorizing an input pattern of waveform as described above wherein the step (a) further includes a step of converting each of the standard patterns into a standard LPC cepstra vector (step 55 in FIG. 4) prior to storing the standard cepstra vectors in the dictionary means. And the step of converting the input pattern of waveform representing an unknown syllable into a categorizing pattern is a step of converting the input pattern of waveform into a categorizing LPC cepstra vector (step 55) for matching with the standard LPC cepstra vectors in the step (c).

In another preferred embodiment, the method for matching and categorizing an input pattern of waveform wherein the step (a) further includes a step of compressing each of the standard cepstra vectors into a standard compressed cepstra vector (step 60), by utilizing a compression means, prior to a step of storing the standard compressed cepstra vectors in the dictionary means. And, the step (c) further includes a step of compressing the categorizing LPC cepstra vector into a compressed categorizing LPC cepstra vector (step 60), by utilizing the compression means, prior to the step of matching with the standard compressed LPC cepstra vectors for computing a Bayesian mis-categorization risk for each of the standard syllables.

In another preferred embodiment, the method for matching and categorizing an input pattern of waveform further comprises a step of (e) providing an user interface means 18 to allow an user of the method for matching and categorizing the input pattern of waveform to input data and commands for controlling the operation of the method.

In yet another preferred embodiment, the method for matching and categorizing an input pattern of waveform further comprises the steps of (a1) providing a receiver 12 for receiving the input pattern of waveform; and (a2) utilizing an analog to digital conversion means 14 for converting the input pattern of waveform to a plurality of digital data representing the input pattern of waveform wherein the steps (a1) and (a2) are performed prior to the performance of the step (a) as illustrated in FIG. 1.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A pattern matching system provided for performing a sequence of single syllables recognition comprising:

a dictionary means for storing a plurality of standard patterns wherein each of said standard patterns representing a single standard syllable by a set of feature vectors C(1), C(2), C(3), . . . , and C(M) and M being a positive integer;

a converting means for converting an input pattern representing single unknown syllable into a categorizing pattern for representing said single unknown syllable in a set of categorizing vectors X where X={x(1), x(2),x (3), . . . ,x(k)} where k representing a positive integer; and a Bayesian-decision-rule categorizing means for computing a conditional normal density function $f(x|\ Ci)$ for each of said feature vectors Ci, wherein said function $f(x|\ Ci)$ having a normal distribution and said x(1), x(2), x(3), . . . and x(k) are stochastically independent; and said Bayesian-decision-rule categorizing means further employing functional parameters of said normal distribution for said normal density function $f(x|\ Ci)$ to apply a Bayesian decision rule to deterministically identify said single unknown syllable with one of said standard single syllables.

2. The pattern matching system of claim 1 wherein:

said Bayesian-decision-rule categorizing means further computing said conditional normal density function $f(x|\ Ci)$ as:

$$f(x1,\ldots,xk|Ci) = \left[\prod_{l=1}^{k} 1/(\sqrt{2^l}\ \sigma_{il})\right] e^{-(\frac{1}{2})\sum_{l=1}^{k}(x-\mu_{il}/\sigma_{il})^2}$$

where i=1,2,3, . . . , M and M is number of syllables to be recognized;

said Bayesian-decision-rule categorizing means further computing logarithmic values of $f(x1,\ldots,xk|\ Ci)$ for comparing values of L (C$_i$) where:

$$L(Ci) = \sum_{l=1}^{K} \log\sigma_{il} + (1/2)\sum_{l=1}^{k}(x-\mu_{il}/\sigma_{il})^2$$

for deterministically identifying a category Ci which has the least L(Ci) as said standard syllable for identifying with said single unknown syllable.

3. The pattern matching system of claim 2 further comprises:

a linear predictive coding (LPC) means for converting each of said standard patterns into a LPC cepstra, and for converting said categorizing patterns into a categorizing LPC cepstra vector; and a compression means for compressing said LPC cepstra vector into a compressed standard pattern represented by said of feature vectors C(1), C(2), C(3), . . . ,C(M), for storing in said dictionary means, and for compressing said categorizing LPC cepstra vectors into a compressed categorizing patterns represented by said set of categorizing vectors X where X={(x(1),x(2),x(3), . . . ,x(k)} for storing in said dictionary means.

4. The pattern matching system of claim 2 further comprises:

an user interface means to allow an user of said pattern matching system to provide input data and commands for controlling the operation of said matching system.

5. The pattern matching system of claim 4 further comprises:

a receiver for receiving an incoming syllable utterance in the form of wavefunctions; and an analog to digital conversion means for converting said wavefunctions to a plurality of digital data representing said wavefunctions.

6. A pattern matching system provided for performing a sequence of single syllables recognition comprising:

a receiver for receiving an incoming syllable utterance of either a standard syllable or a single unknown syllable for syllable recognition in the form of wavefunctions;

an analog to digital conversion means for converting said wavefunctions to a plurality of digital data representing said wave functions;

a linear predictive coding (LPC) means for converting said digital data representing said input wavefunction into a LPC cepstra vector;

a compression means for compressing said each LPC cepstra vector into a compressed cepstra vector wherein said unknown syllable is represented by a set of categorizing vectors X where $X=\{x(1), x(2), x(3), \ldots, x(k)\}$;

a dictionary means for storing a plurality of standard compressed cepstra vectors each representing a standard single syllable by a set of feature vectors $C(1)$, $C(2)$, $C(3)$, ..., and $C(M)$;

a Bayesian-decision-rule categorizing means for computing a conditional normal density function $f(x|Ci)$ for each of said feature vectors Ci, assuming that said function $f(x|Ci)$ having a normal distribution and said $x(1)$, $x(2)$, $x(3)$, ... and $x(k)$ are stochastically independent;, said Bayesian-decision-rule categorizing means further employing functional parameters of said normal distribution for said normal density function $f(x|Ci)$ to apply a Bayesian decision rule to deterministically identify said single unknown syllable with one of said standard syllables; and an user interface means to low an user of said pattern matching system to provide input data and commands for controlling the operation of said matching system.

7. The pattern matching system of claim 6 wherein:

said compression means compressing said LPC cepstra vectors represented by Yk where $Yk=\{y(k)_1, y(k)_2, y(k)_3, \ldots, y(k)_p\}$ and $K=1,2,3 \ldots, n$, by deleting a stable portion of said vectors with a difference of two of said consecutive LPC cepstra vectors be denoted as:

$$D(k) = \sum_{i=1}^{p} |y(k)i - y(k-1)i|$$

for $k=2, 3, 4, \ldots, n$, and by deleting one of said LPC cepstra vectors when said D(K) is below a pre-designated threshold value.

8. The pattern matching system of claim 7 wherein:

said compression means compressing said LPC cepstra vectors represented by Y'k where $Y'k=\{y'(k)_1, y'(k)_2, y'(k)_3, \ldots, y'(k)_p\}$ and $K=1,2,3 \ldots, m$, according to a sum S1 of absolute differences of two consecutive LPC cepstra vectors wherein:

$$S1 = \sum_{k=2}^{m} \sum_{i=1}^{p} |y'(k)i - y'(k-1)i|,$$

and said LPC cepstra vectors are divided into a plurality sections with an average value of said LPC cepstra vectors in each of section characterized by a sum-difference-feature of said section.

9. The pattern matching system of claim 6 wherein:

said compression means compressing said LPC cepstra vectors represented by Yk where $Yk=\{y(k)_1, y(k)_2, y(k)_3, \ldots, y(k)_p\}$ and $K=1,2,3 \ldots, n$, by normalizing each of said LPC cepstra vectors by applying a total sum of absolute values of said LPC cepstra vector S wherein:

$$S = \sum_{k=1}^{n} \sum_{i=1}^{p} |y(k)i|$$

and by dividing a syllable into a M sections wherein M is a positive integer and said LPC cepstra vectors for each section are normalized to an absolute value of S/M.

10. A method for matching and categorizing an input pattern of waveform applicable for syllable recognition comprising the steps of:.

(a) storing in a dictionary means a plurality of standard patterns wherein each of said standard patterns representing a standard single syllable by a set of feature vectors $C(1)$, $C(2)$, $C(3)$, ..., and $C(M)$ and M being a positive integer;

(b) converting said input pattern of waveform representing an unknown single syllable into a categorizing pattern for representing said unknown syllable by a set of categorizing vectors X where $X=\{x(1), x(2), x(3), \ldots, x(k)\}$ and k being a positive integer;

(c) utilizing a Bayesian-decision-rule categorizing means for computing a conditional normal density function $f(x|Ci)$ wherein said function $f(x|Ci)$ having a normal distribution and said $x(1)$, $x(2)$, $x(3)$, ... and $x(k)$ are stochastically independent;, and (d) employing functional parameters of said normal distribution for said normal density function $f(x|Ci)$ to apply a Bayesian decision rule to identify said input unknown single syllable with one of said standard single syllables.

11. The method for matching and categorizing an input pattern of waveform as recited in claim 10 wherein:

said step (a) further includes a step of converting each of said standard patterns into a standard LPC cepstra vector; and said step of converting said input pattern of waveform representing an unknown single syllable into a categorizing pattern is a step of converting said input pattern of waveform into a categorizing LPC cepstra vector.

12. The method for matching and categorizing an input pattern of waveform as recited in claim 11 wherein:

said step (a) further includes a step of compressing each of said standard cepstra vectors into a set of standard compressed cepstra vectors represented by said of feature vectors $C(1)$, $C(2)$, $C(3)$, ..., and $C(M)$, for storing in said dictionary means; and said step (c) further includes a step of compressing said categorizing LPC cepstra vector into a compressed categorizing LPC cepstra vector represent by said set of categorizing vectors X where $X=\{x(1), x(2), x(3), \ldots, x(k)\}$.

13. The method for matching and categorizing an input pattern of waveform as recited in claim 12 further comprises a step of:

(e) providing an user interface means to allow an user of said method for matching and categorizing said input pattern of waveform to input data and commands for controlling the operation of said method.

14. The method for matching and categorizing an input pattern of waveform as recited in claim 13 further comprises the steps of:

(a1) providing a receiver for receiving said input pattern of waveform; and (a2) utilizing an analog to digital conversion means for converting said input pattern of waveform to a plurality of digital data representing said input pattern of waveform wherein said steps (a1) and (a2) are performed prior to the performance of said step (a).

* * * * *

UNITED STATES PATENT AND TRADEMARK OFFICE
CERTIFICATE OF CORRECTION

PATENT NO. : 5,704,004
DATED : December 30, 1997
INVENTOR(S) : Tze Fen LI et al.

It is certified that error appears in the above-indentified patent and that said Letters Patent is hereby corrected as shown below:

Claim 1, column 10, line 13, "representing" should read --represents--.

Claim 6, column 11, line 44, "low" should read --allow--.
--allow--;

line 36, "independent;." should read --independent;--.

Claim 8, column 11, line 61, "dain 7" should read --claim 7--.

Claim 10, column 12, line 25, "of:." should read --of:--.

Claim 12, column 12, line 65, "represent" should read --represented--.

UNITED STATES PATENT AND TRADEMARK OFFICE
CERTIFICATE OF CORRECTION

PATENT NO. : 5,704,004
DATED : December 30, 1997
INVENTOR(S) : Tze Fen LI et al.

It is certified that error appears in the above-indentified patent and that said Letters Patent is hereby corrected as shown below:

Claim 13, column 13, line 4, "an user" (both occurrences) should read --a user--.

Signed and Sealed this

Fourth Day of August, 1998

*Attest:*

*Attesting Officer*

BRUCE LEHMAN

*Commissioner of Patents and Trademarks*